United States Patent
Sinclair

(10) Patent No.: US 10,642,692 B2
(45) Date of Patent: May 5, 2020

(54) SYSTEM OF METHOD OF STORING DATA IN A SELF-SERVICE TERMINAL

(75) Inventor: Colin A. Sinclair, Angus (GB)

(73) Assignee: NCR Corporation, Atlanta, GA (US)

( * ) Notice: Subject to any disclaimer, the term of this patent is extended or adjusted under 35 U.S.C. 154(b) by 1287 days.

(21) Appl. No.: 12/148,455

(22) Filed: Apr. 18, 2008

(65) Prior Publication Data

US 2009/0265517 A1 Oct. 22, 2009

(51) Int. Cl.
*G06F 12/02* (2006.01)
*G06F 11/14* (2006.01)
*G06F 11/20* (2006.01)

(52) U.S. Cl.
CPC ...... *G06F 11/1402* (2013.01); *G06F 11/2094* (2013.01); *G06F 11/2097* (2013.01); *G06F 12/0246* (2013.01)

(58) Field of Classification Search
None
See application file for complete search history.

(56) References Cited

U.S. PATENT DOCUMENTS

| | | | | |
|---|---|---|---|---|
| 7,232,063 | B2* | 6/2007 | Fandel | G06Q 20/20 235/376 |
| 7,912,914 | B2* | 3/2011 | Coutts | G06Q 20/1085 709/212 |
| 2002/0111133 | A1* | 8/2002 | Wittkotter | 455/1 |
| 2002/0124139 | A1* | 9/2002 | Baek et al. | 711/114 |
| 2006/0206753 | A1* | 9/2006 | Yamato et al. | 714/6 |
| 2007/0061518 | A1* | 3/2007 | Gotoh | 711/130 |
| 2007/0078901 | A1* | 4/2007 | Satou et al. | 707/200 |

OTHER PUBLICATIONS

Dictionary.com Definition for the term "firmware", pp. 1-2.*
Dictionary.com Definition for the term "augment", pp. 1-2.*
Dictionary.com Definition for the term "automated teller machine", pp. 1-2.*

* cited by examiner

*Primary Examiner* — Brian R Peugh
(74) *Attorney, Agent, or Firm* — Schwegman, Lundberg & Woessner

(57) ABSTRACT

Methods and apparatus are described in which data, which is required by system software in a self-service terminal, is stored across a number of persistent storage elements. The persistent storage elements are located in peripheral devices within the self-service terminal. When the data is lost from volatile memory in the core computing device in the self-service terminal, the data is read back from one or more of the persistent storage elements.

22 Claims, 3 Drawing Sheets

SYSTEM OF METHOD OF STORING DATA IN A SELF-SERVICE TERMINAL

TECHNICAL FIELD

The present invention relates to persistent storage of data in a self-service terminal. It is particularly related to, but in no way limited to, persistent storage of essential data in a self-service terminal (SST) such as an automated teller machine (ATM).

BACKGROUND

ATM system software requires persistent storage to maintain particular data across re-boots and system re-installation. This data includes, for example, the serial number and product class of the machine. Typically this persistent storage is provided by an area of battery backed non-volatile random access memory (NVRAM) held on a special PC adapter card or on the motherboard of the PC core of an ATM.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Methods and apparatus are described in which data, which is required by system software in a self-service terminal, is stored across a number of persistent storage elements. The persistent storage elements are located in peripheral devices within the self-service terminal. When the data is lost from volatile memory in the core computing device in the self-service terminal, the data is read back from one or more of the persistent storage elements.

A first aspect provides a method of operating a self-service terminal, the self-service terminal comprising a core computing device running system software and a plurality of peripheral devices and the method comprising: storing data which is required by the system software on a plurality of persistent storage elements, wherein at least one persistent storage element is located in one of the plurality of peripheral devices; and subsequently reading data portions from one or more of the plurality of persistent storage elements and recreating the data which is required by the system software.

The method may further comprise: storing the data in a non-persistent store associated with the core computing device; updating the data in the non-persistent store; and periodically storing the updated data on a plurality of persistent storage elements.

The steps of reading and recreating the data may be performed following loss of the data in the non-persistent store.

One of the plurality of persistent storage elements may comprise a hard disk associated with the core computing device. Storing data which is required by the system software on a plurality of persistent storage elements may comprise: storing data on at least one persistent storage element located in one of the plurality of peripheral devices; and storing an encrypted version of the data on a hard disk drive associated with the core computing device.

Reading data portions from one or more of the plurality of persistent storage elements and recreating the data which is required by the system software may comprise: reading data portions from any available persistent storage elements from the plurality of persistent storage elements; integrity checking each data portion; and recreating the data which is required by the system software from checked data portions.

The self-service terminal may be an automated teller machine.

A second aspect provides a computer program comprising computer program code means adapted to perform all the steps of any of the methods described above when said program is run on a computer.

The computer program may be embodied on a tangible computer readable medium.

A third aspect provides a self-service terminal comprising: a plurality of peripheral devices, at least one of the peripheral devices comprising a persistent storage element; and a core computing device arranged to run system software and further comprising: a storage manager arranged to store data required by the system software on at least two persistent storage elements.

The storage manager may be further arranged to: read data portions from one or more of the persistent storage elements; and recreate the data which is required by the system software.

The storage manager may be further arranged to: store the data in a non-persistent store associated with the core computing device, and wherein the storage manager may be arranged to perform the reading and recreating following loss of the data in the non-persistent store.

The storage manager may be further arranged to update the data in the non-persistent store and periodically store the updated data on a plurality of persistent storage elements.

The storage manager may be further arranged to perform integrity checking on each data portion, and wherein the data is recreated from checked data portions.

Each peripheral device may further comprise a peripheral storage provider arranged to enable the storage manager to read and write to the persistent storage element.

The core computing device may further comprise a scattered storage provider arranged to interface between the storage manager and peripheral storage providers in each of the plurality of peripheral devices.

The at least two persistent storage elements may comprise at least one persistent storage element using a first storage technology and at least one persistent storage element using a second storage technology and wherein the core computing device may comprise: a first scattered storage provider arranged to interface between the storage manager and a peripheral storage provider in a peripheral device comprising a persistent storage element using the first storage technology; and a second scattered storage provider arranged to interface between the storage manager and a peripheral storage provider in a peripheral device comprising a persistent storage element using the second storage technology.

The self-service terminal may be an automated teller machine.

A fourth aspect provides one or more tangible device-readable media with device-executable instructions for performing steps comprising: storing data which is required by system software on a plurality of persistent storage elements, wherein at least one persistent storage element is located in one of a plurality of peripheral devices associated with a self-service terminal and wherein the system software is arranged to run on a core computing device in the self-service terminal; and subsequently reading data portions from one or more of the plurality of persistent storage elements and recreating the data which is required by the system software.

The one or more tangible device-readable media may further comprise device-executable instructions for performing steps comprising: storing the data in a non-persistent store associated with the core computing device; updating the data in the non-persistent store; and periodically storing the updated data on a plurality of persistent storage elements.

Reading and recreating the data may be performed following loss of the data in the non-persistent store.

One of the plurality of persistent storage elements may comprise a hard disk associated with the core computing device. The device-executable instructions for performing steps comprising storing data which is required by system software on a plurality of persistent storage elements may comprise device-executable instructions for performing steps comprising: storing data on at least on persistent storage element located in one of the plurality of peripheral devices associated with the self-service terminal; and storing an encrypted version of the data on a hard disk drive associated with the core computing device.

The device-executable instructions for performing steps comprising reading data portions from one or more of the plurality of persistent storage elements and recreating the data which is required by the system software may comprise device-executable instructions for performing steps comprising: reading data portions from any available persistent storage elements from the plurality of persistent storage elements; integrity checking each data portion; and recreating the data which is required by the system software from checked data portions.

Many of the attendant features will be more readily appreciated as the same becomes better understood by reference to the following detailed description considered in connection with the accompanying drawings. The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
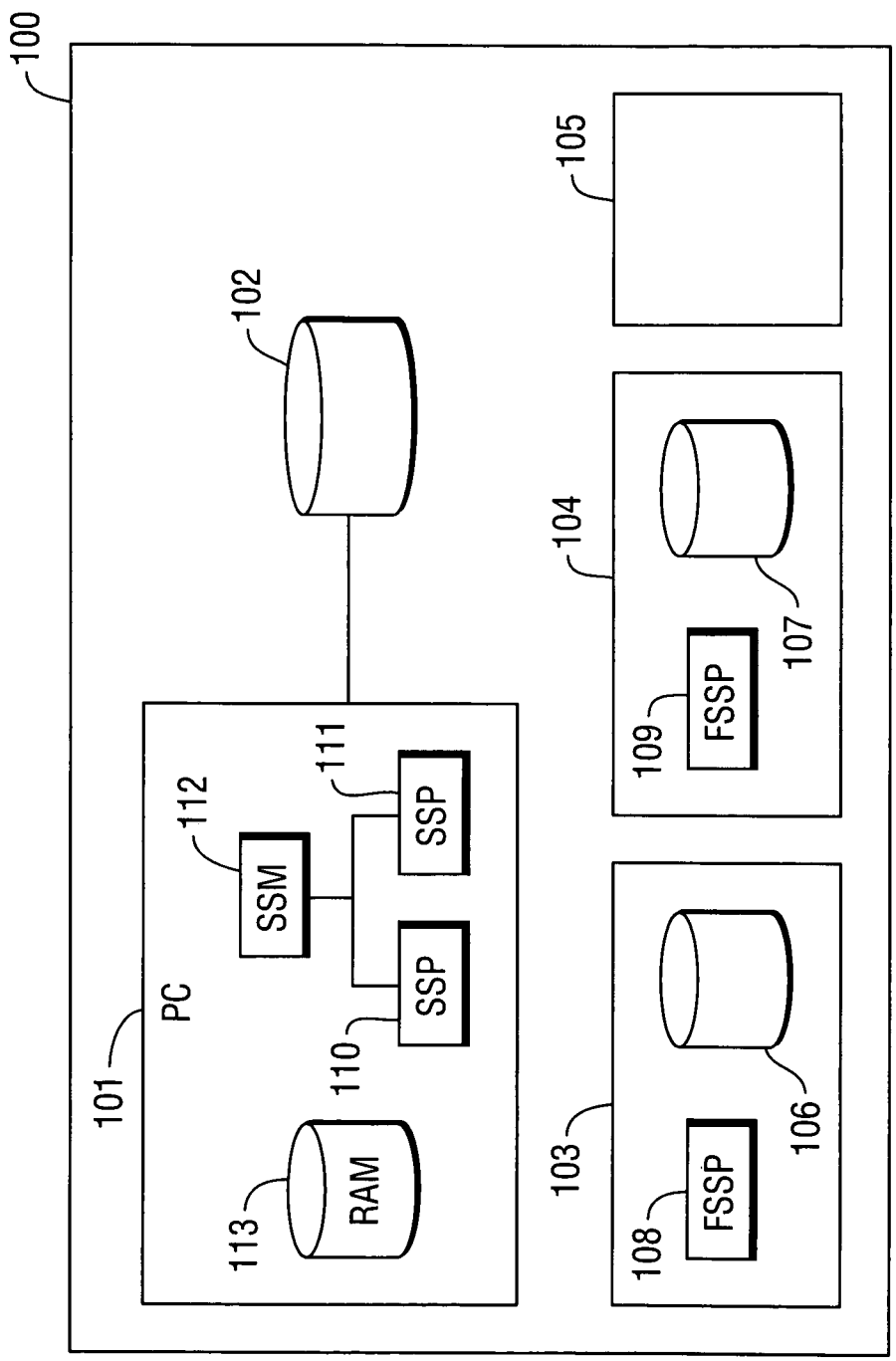
FIG. 1 is a schematic diagram of an ATM.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved.

In some situations, an ATM may not have any system NVRAM. This may be because the NVRAM has been removed for cost reduction purposes. In such an ATM the only form of persistent storage may be a hard disk drive. However, hard disks are frequently replaced, reinstalled or erased and in each situation any data stored on the hard disk will be lost.

FIG. 1 shows a schematic diagram of an ATM 100 which comprises a PC core 101 and associated hard drive 102, along with a number of peripheral devices 103-105. These peripheral devices may comprise, for example, a cash dispenser, a printer, a miscellaneous interface board, a depository, a recycling unit, a key pad, a display screen (which may or may not be touch sensitive), etc. In this example, the PC core 101 has no associated persistent storage other than hard device 102.

One or more of the peripherals 103, 104 comprise a persistent storage element 106, 107 and these persistent storage elements within the peripheral devices are used to store the data which is required by the ATM system software and needs to be maintained across re-boots, re-installation etc. This data is referred to herein as 'essential data'. The essential data may comprise one or more of:

Environmental data, such as the serial number, product class, geographic address of the ATM, and configuration data (e.g. whether the machine is serviced from the front or the back);

Transaction counters, which store the number of operations performed by the ATM over its entire life; and Configuration data, such as the required configuration for the media entry indicator (MEI).

The total size of the essential data may, in some examples, be very small, e.g. 1.5 KB. The same essential data may be stored in each of the elements of persistent storage 106, 107 within the peripheral devices of an ATM or alternatively different data may be stored on different elements of persistent storage. If any element of the essential data is stored in more than one element of persistent storage, there is increased resilience for peripheral failure and/or peripheral replacement. There may be other peripheral devices, (e.g. device 105), which do not include an element of persistent storage or that do not include an element of persistent storage which can be used to store essential data.

In an example, the two peripherals 103, 104 which comprise persistent storage 106, 107 which may be used for storing essential data may be a cash dispenser unit and a key pad unit. The peripheral device 105 which does not comprise persistent storage which can be used may comprise a touch screen. In another example, a single peripheral 103 may be used for storing essential data (in persistent storage 106).

The persistent storage elements provided in different peripheral devices may use different technologies, such as EEPROM on a USB device, battery backed NVRAM (e.g. on a specialised device), a memory card (e.g. an SD card), a hard disk etc. The persistent storage elements provided within the peripherals of an ATM are referred to collectively as 'scattered storage'.

Figure 2:
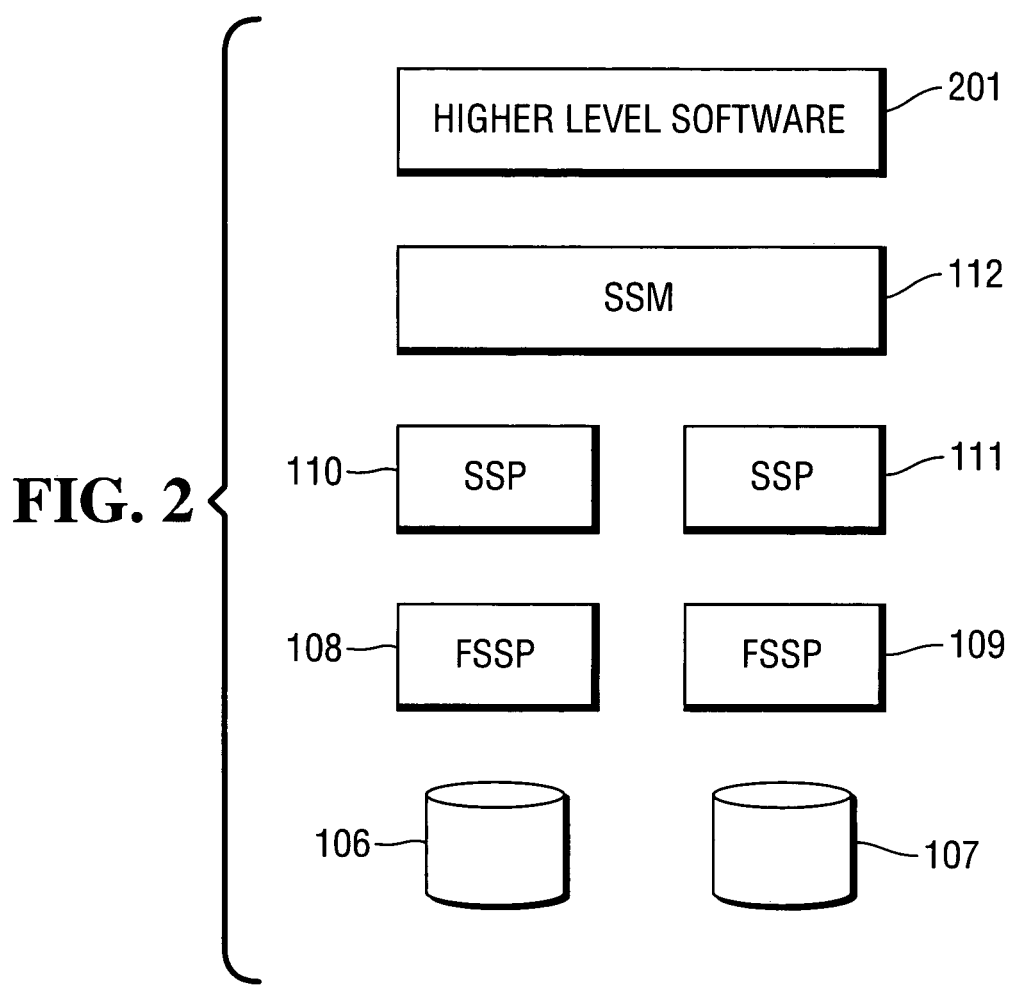
FIG. 2 shows a schematic diagram of logical layers in an ATM.

There are three different types of elements within the ATM which are used to manage the storage of essential data onto the persistent storage elements within the peripheral devices: the Firmware Scattered Storage Provider (FSSP) 108, 109, the Scattered Storage Provider (SSP) 110, 111 and the Scattered Storage Manager (SSM) 112. These elements may be considered to operate in different layers, as shown in the schematic diagram of FIG. 2.

The FSSP 108, 109, which may also be referred to as the 'Peripheral Storage Provider' runs in the firmware of the particular peripheral device (e.g. FSSP 108 runs in the firmware of peripheral device 103) and provides an interface to the persistent storage element 106, 107. Each FSSP may be specific to the technology of the persistent storage, and where there is more than one peripheral in the ATM which has the same type of persistent storage (e.g. NVRAM), there will be more than one instance of a specific technology FSSP in the ATM.

As described above, not all peripherals may support scattered storage. This may be because they do not contain any persistent storage (e.g. peripheral device 105) or it may be because it is not possible to run an FSSP in the firmware. In some examples, it may not be possible to run an FSSP in the firmware because the peripheral is a third party device which does not provide means to load the FSSP or otherwise does not provide external access to the firmware.

Whilst the FSSP is described above as running in the firmware of the peripheral device, in other examples the FSSP may run in software or may otherwise be integrated within the peripheral device.

The SSP 110, 111, which runs in the PC core of the ATM, interfaces to the FSSP 108, 109 and there is one SSP instance for each technology. For example, where an ATM comprises two peripherals which each comprise a persistent storage element which uses the same technology, there will only be a single SSP which interfaces to the FSSP in each peripheral device. The SSP scans for devices that support scattered storage within the ATM (and use the technology with which the particular instance of SSP is associated) and provides a generic interface for accessing the persistent storage elements to higher layers (i.e. the SSM, described below). This generic SSP interface, which is independent of the underlying storage technology used, provides the ability to query for status and capabilities as well as providing read and write access to the storage elements. The generic interface may also provide reporting of capabilities which may differ according to the particular storage technology used, e.g. whether the device has limited write life-time, whether it has the ability to write at a byte level, etc.

The SSM 112, which also runs in the PC core of the ATM and may also be referred to as the 'Storage Manager', is the central scattered storage controlling software and the SSM communicates with the various SSPs using the generic SSP interface. It may also use the hard disk 102 associated with the PC core as an additional storage device, without requiring an SSP. The SSM stores the essential data on the scattered storage provided by the peripheral devices (and the hard disk, where used) and also resolves the data accessed from each of the peripheral devices, when required. In reading and writing from/to the scattered storage, the SSM instantiates the correct SSP for the underlying storage technology. In addition to writing the essential data to the scattered storage, the SSM may also write an encrypted copy of the essential data to the local hard disk 102. This encrypted version may be tied to the particular hard disk such that it cannot be copied onto another hard disk or if it is, the unencrypted data may be unrecoverable. The hard disk may be considered to be another scattered storage element, where the data is not fully persistent because it can be erased by re-imaging the hard disk. This encrypted data provides a back-up data source in case on system re-boot the PC core cannot communicate with any peripheral devices. The SSM also provides an API for higher level functional software 201 to make use of the scattered storage.

It will be appreciated that FIG. 1 shows those elements which are required for the following description only and that an ATM may comprise other elements not shown in FIG. 1 (e.g. media cassettes). Furthermore, one or more of the elements shown in FIG. 1 may be combined in any manner.

Figure 3:
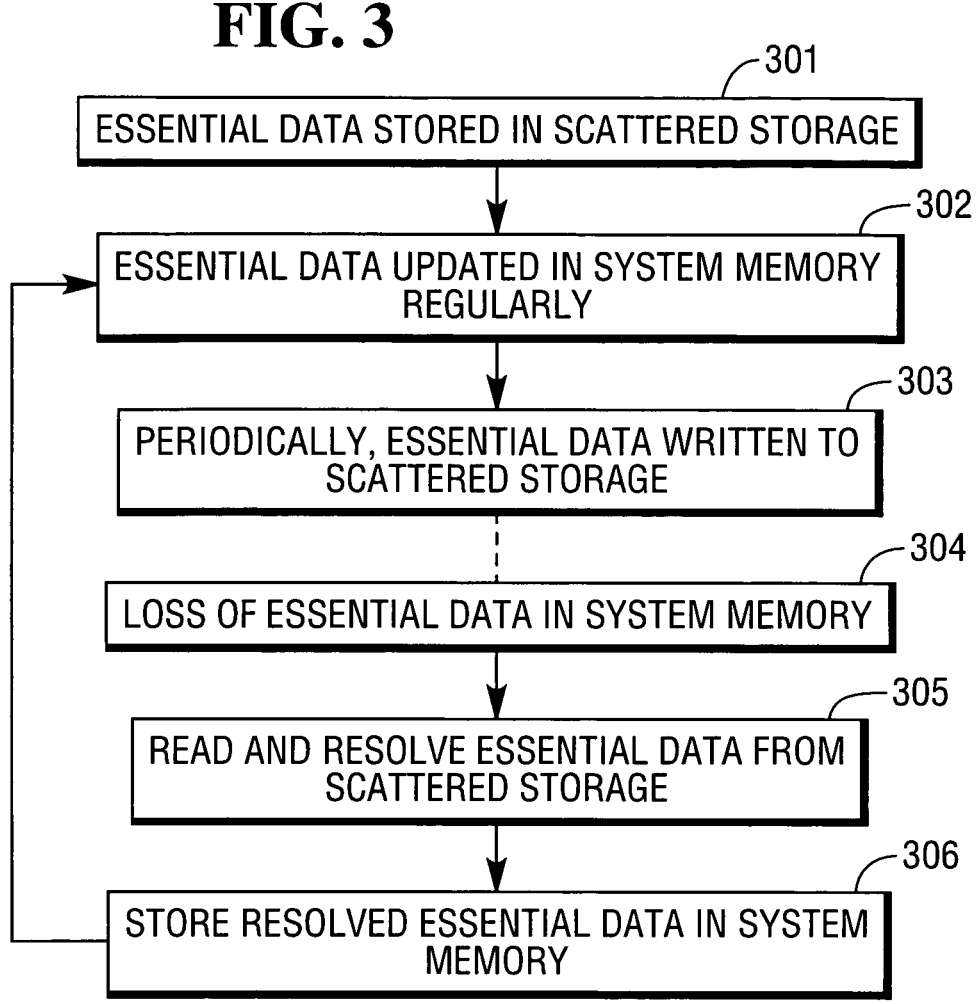
FIG. 3 shows a flow diagram of an example method of operation of an ATM.

FIG. 3 shows a flow diagram of an example method of operation of an ATM. Initially the essential data is stored in the scattered storage (block 301). Where there is sufficient space, the essential data may be written in each element of the scattered storage; however, where the capacity of the storage elements is not sufficient, the essential data may be split between scattered storage elements. In an example, the essential data may be divided into parts and the scattered storage elements may be grouped (logically), such that each group of scattered storage elements is used to store a different part of the essential data. In other examples, the essential data may be split and stored across the scattered storage elements in other ways. Whilst in some cases, a part of the essential data may only be stored in a single scattered storage element, ensuring that each part of the essential data is stored in more than one location provides increased reliability and resilience. When the data is stored, the SSM also writes cyclic redundancy check (CRC) bytes with the data which can then be used subsequently to determine whether the data has been corrupted (in block 305, described below). This management of the storage of the essential data is performed by the SSM.

During operation of the ATM, the essential data may change (e.g. the transaction counters, as described above) and therefore the essential data may be updated in system memory 113 regularly (block 302) e.g. hourly. This system memory 113 within the PC core may be volatile RAM. The regularity with which the essential data changes, and therefore the regularity with which updating is required, depends on the nature of the data which comprises essential data. In some examples, the essential data may be static and may not require updating. The essential data stored in the scattered storage may be updated less frequently than the system memory 113 (block 303). For example, the essential data may be written to the scattered storage once every day.

Figure 4:
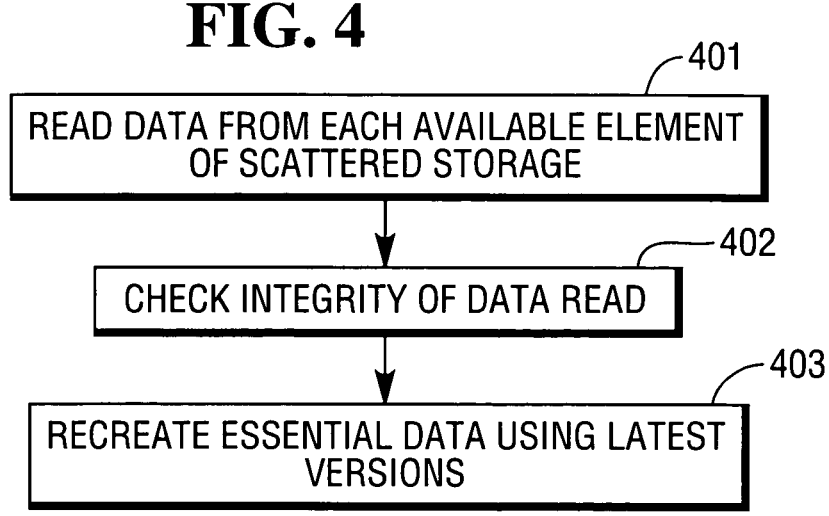
FIG. 4 shows one of the method steps of FIG. 3 in more detail.

When the essential data is subsequently lost from the system memory 113, for example, when the ATM is re-booted or re-installed, the SSM reads and resolves the essential data from the scattered storage elements (block 305). FIG. 4 shows an example of this block in more detail. Data is read from each available element of scattered storage (block 401). This may not include reading from all the elements of scattered storage to which the data was written (in block 303) because peripheral devices may have failed or been removed or replaced. When data is read from an element of scattered storage (via the SSP and FSSP), the integrity of this data is checked (block 402), e.g. by checking the CRC. A set of algorithms may be used to check various fields in the stored data for consistency and integrity. One of the fields in the stored data may be a version number or other data (e.g. a date/time when stored) which identifies when the data was stored or last updated. Another of the fields may be the CRC byte (as described above) and a further field may be a stamp which is similar to a signature associated with the data. Having checked the data (in block 402), the essential data can be recreated using the most recent non-corrupted versions of the data read from the scattered storage (block 403). This recreated data may be referred to as 'resolved storage' or 'resolved essential data'.

After the data has been resolved, any storage elements which comprise out of date or corrupted essential data (or parts thereof) may be refreshed with up to date essential data (or part thereof), i.e. new data is written to the storage element comprising the out of date or corrupted data.

Having recovered the essential data (in block 305), the resolved essential data is stored in the system memory 113 (block 306) and the process continues with the essential data being updated frequently in system memory (block 302) and less frequently being written to scattered storage (block 303), as described above.

In the example shown in FIG. 3, the essential data is updated more frequently in the system memory than in the scattered storage. This may be beneficial where the essential data is updated regularly (which may be dependent on how often the data which is included within the essential data changes) and where there is a limited number of writes which are possible to a particular type of persistent storage which is used in a peripheral device. In some cases, the writing schedule (in block 303) may be tailored to the particular technology with technologies that can be written very many times being written to more regularly than memory types with a more limited number of possible writes (e.g. EEPROM has a large, but limited, number of writes). In other examples, where the persistent storage in the peripheral devices is not limited by the number of writes which are possible in the life of the device (or this number is extremely large), the essential data may be written to scattered storage more often (e.g. at the same time that the data is updated in the system memory).

In addition to, or instead of, tailoring the writing schedule to the type of persistent storage (or a characteristic of the persistent storage), the writing schedule to the scattered storage may be tailored dependent on the size of the particular elements of persistent storage within each of the peripheral devices. Where devices are grouped together (as described above), devices having similar storage capacities may be grouped together and used to store a part of the essential data which is appropriate for the storage capacity of those devices in the group. This tailoring may be particularly beneficial where an ATM comprises peripherals of different ages and where newer peripherals may comprise more persistent storage than older peripheral devices.

Although the above description refers to an ATM which does not comprise any non-volatile memory associated with the PC core to provide persistent storage, the techniques described above may also be implemented where the PC core does comprise persistent storage. In such an example, use of scattered storage techniques may be used to provide increased reliability and robustness against failure or corruption of memory.

Whilst the above description refers to scattered storage being implemented in an ATM which dispenses money, this is by way of example only and the functionality may be implemented in any SST dispensing any type of media. For example, the functionality may be implemented in a SST which sells tickets.

Use of scattered storage, as described above, enables SSTs to be developed which do not require special system persistent storage hardware in the PC core. This provides a cost reduction for the SST. Furthermore, storage redundancy (i.e. storing the same data in more than one location) increases the reliability.

Any range or device value given herein may be extended or altered without losing the effect sought, as will be apparent to the skilled person. It will be understood that the benefits and advantages described above may relate to one embodiment or may relate to several embodiments. It will further be understood that reference to 'an' item refer to one or more of those items.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The methods described herein may be performed by software in machine readable form on a tangible storage medium. The software can be suitable for execution on a parallel processor or a serial processor such that the method steps may be carried out in any suitable order, or simultaneously. This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

What is claimed is:

1. A method of operating a self-service terminal, the self-service terminal comprising a Personal Computer (PC) core running system software and a plurality of peripheral devices and the method comprising:
   storing, by the PC core, system software data which is required by the system software to operate the self-service terminal on a plurality of persistent storage elements of the self-service terminal by scanning, by the PC core, the plurality of peripheral devices and identifying, by the PC core, at least some of the system software data required by the system software to operate on at least one persistent storage element located in the plurality of peripheral devices, wherein the plurality of peripheral devices include: a cash dispenser and a keypad, and wherein the system software data includes essential data representing a serial number for the self-service terminal and configuration data for processing media associated with the self-service terminal, and interacting, by the PC core with the plurality of peripheral devices providing an additional function besides storage and retrieval of the data and including a customer interface function during a transaction at the self-service terminal; and subsequently reading, by the PC core, data portions from the at least one persistent storage element and recreating the system software data which is required by the system software.

2. A method according to claim 1, further comprising:
storing, by the PC core, the system software data in a non-persistent store associated with the PC core;
updating, by the PC core, the system software data in the non-persistent store; and
periodically storing, by the PC core, the updated system software data on a plurality of persistent storage elements.

3. A method according to claim 2, wherein reading and recreating the system software data is performed following loss of the system software data in the non-persistent store.

4. A method according to claim 1, wherein one of the plurality of persistent storage elements comprises a hard disk associated with the PC core, and wherein storing the system software data which is required by the system software on a plurality of persistent storage elements comprises:
storing, by the PC core, system software data on at least one persistent storage element located in one of the plurality of peripheral devices; and
storing, by the PC core, an encrypted version of the system software data on a hard disk drive associated with the PC core.

5. A method according to claim 1, wherein reading data portions from one or more of the plurality of persistent storage elements and recreating the system software data which is required by the system software comprises:
reading, by the PC core, data portions from any available persistent storage elements from the plurality of persistent storage elements;
integrity, by the PC core, checking each data portion; and
recreating, by the PC core, the system software data which is required by the system software from checked data portions.

6. A method according to claim 1, wherein the self-service terminal is an automated teller machine.

7. A self-service terminal comprising:
a plurality of peripheral devices, each peripheral device comprising a persistent storage element configured to store and provide system software data required by system software of a Personal Computer (PC) core of the self-service terminal, and wherein the plurality of peripheral devices include an additional function besides the storage and the retrieval of the data including a customer interface function during a transaction at the self-service terminal processed by the PC core, and wherein the plurality of peripheral devices comprising: a cash dispenser and a keypad, and wherein the system software data is essential data representing a serial number for the self-service terminal and configuration data for processing media associated with the self-service terminal; and
the PC core arranged to execute the system software and including a storage manager arranged to store the system software data on at least two persistent storage elements, and wherein the system software data includes data required by the system software to operate the self-service terminal.

8. A self-service terminal according to claim 7, wherein the storage manager is further arranged to:
read, by the PC core, data portions from one or more of the persistent storage elements; and
recreate, by the PC core, the system software data which is required by the system software.

9. A self-service terminal according to claim 8, wherein the storage manager is further arranged to:
store, by the PC core, the system software data in a non-persistent store associated with the PC core, and wherein the storage manager is arranged to perform the reading and recreating following loss of the data in the non-persistent store.

10. A self-service terminal according to claim 9, wherein the storage manager is further arranged to:
update, by the PC core, the system software data in the non-persistent store; and
periodically store, by the PC core, the updated system software data on a plurality of persistent storage elements.

11. A self-service terminal according to claim 8, wherein the storage manager is further arranged to perform integrity checking on each data portion, and wherein the data is recreated from checked data portions.

12. A self-service terminal according to claim 7, wherein each peripheral device further comprises a peripheral storage provider arranged to enable the storage manager to read and write to the persistent storage element.

13. A self-service terminal according to claim 12, wherein the PC core further comprises a scattered storage provider arranged to interface between the storage manager and peripheral storage providers in each of the plurality of peripheral devices.

14. A self-service terminal according to claim 13, wherein the at least two persistent storage elements comprise at least one persistent storage element using a first storage technology and at least one persistent storage element using a second storage technology and wherein the PC core comprises:
a first scattered storage provider arranged to interface between the storage manager and a peripheral storage provider in a peripheral device comprising a persistent storage element using the first storage technology; and
a second scattered storage provider arranged to interface between the storage manager and a peripheral storage provider in a peripheral device comprising a persistent storage element using the second storage technology.

15. A self-service terminal according to claim 7, which is an automated teller machine.

16. One or more tangible device-readable media with device-executable instructions for performing steps comprising:
storing, by a Personal Computer (PC) core, system software data which is required by system software to operate a self-service terminal on a plurality of persistent storage elements of the self-service terminal, wherein at least one persistent storage element is located in a plurality of peripheral devices comprising: a cash dispenser and a keypad, and the plurality of peripheral devices associated with and interfaced to the self-service terminal, and interacting, by the PC core with the plurality of peripheral devices for providing an additional function besides storage and retrieval of the system software data including a customer interface function during a transaction at the self-service terminal, and wherein the system software data includes essential data representing a serial number for the self-service terminal and configuration data for processing media associated with the self-service terminal, and wherein the system software is arranged to execute on the PC core of the self-service terminal; and subsequently reading, by the PC core, data portions of the system software data from the at least one persistent storage element of the plurality of peripheral devices and recreating the system software data which is required by the system software.

17. The one or more tangible device-readable media according to claim 16, further comprising device-executable instructions for performing steps comprising:

storing, by the PC core, the system software data in a non-persistent store associated with the PC core;

updating, by the PC core, the system software data in the non-persistent store; and periodically storing, by the PC core, the updated system software data on a plurality of persistent storage elements.

18. The one or more tangible device-readable media according to claim 17, wherein reading and recreating the system software data is performed following loss of the system software data in the non-persistent store.

19. The one or more tangible device-readable media according to claim 16, wherein one of the plurality of persistent storage elements comprises a hard disk associated with the PC core and wherein storing system software data which is required by system software on a plurality of persistent storage elements comprises:

storing, by the PC core, system software data on at least on persistent storage element located in one of the plurality of peripheral devices associated with the self-service terminal; and storing, by the PC core, an encrypted version of the system software data on a hard disk drive associated with the PC core.

20. The one or more tangible device-readable media according to claim 16, wherein the device-executable instructions for performing steps comprising reading data portions from one or more of the plurality of persistent storage elements and recreating the system software data which is required by the system software comprises device-executable instructions for performing steps comprising:

reading, by the PC core, data portions from any available persistent storage elements from the plurality of persistent storage elements;

integrity checking, by the PC core, each data portion; and recreating, by the PC core, the system software data which is required by the system software from checked data portions.

21. A method of operating a self-service terminal, the self-service terminal comprising a Personal Computer (PC) core running system software and a plurality of peripheral devices and the method comprising:

storing, by the PC core, system software data which is required by the system software to operate the self-service terminal on a plurality of persistent storage elements of the self-service terminal, wherein storing further includes storing some of the system software data that is required by the system software on at least one persistent storage element from the plurality of persistent storage elements, the at least one persistent storage element is located in a cash dispenser peripheral device and a keypad peripheral device of the self-service terminal, and wherein the system software data includes essential data representing a serial number for the self-service terminal and configuration data for processing media associated with the self-service terminal; and subsequently reading, by the PC core, data portions from the at least one persistent storage element and recreating the system software data which is required by the system software for operating the self-service terminal.

22. A method of operating a self-service terminal, the self-service terminal comprising a Personal Computer (PC) core running system software and a plurality of peripheral devices and the method comprising:

storing, by the PC core, system software data which is required by the system software to operate the self-service terminal on a plurality of persistent storage elements of the self-service terminal, wherein storing further includes storing some of the system software data that is required by the system software on at least one persistent storage element from the plurality of persistent storage elements, the at least one persistent storage element associated with a key pad peripheral device and a cash dispenser peripheral device of the self-service terminal; and subsequently reading, by the PC core, data portions from the at least one persistent storage element and recreating, by the PC core, the system software data which is required by the system software, and wherein the system software data is data that includes essential data representing a serial number for the self-service terminal and configuration data for processing media associated with the self-service terminal.

* * * * *